US012660033B2

(12) United States Patent
Qiu et al.

(10) Patent No.: US 12,660,033 B2
(45) Date of Patent: Jun. 16, 2026

(54) SYSTEMS AND METHODS FOR UE CONTEXT RETRIEVAL AND DATA FORWARDING TO SUPPORT SMALL DATA TRANSMISSION

(71) Applicant: Telefonaktiebolaget LM Ericsson (publ), Stockholm (SE)

(72) Inventors: Liwei Qiu, Täby (SE); Yazid Lyazidi, Hässelby (SE); Tuomas Tirronen, Helsinki (FI); Henrik Enbuske, Stockholm (SE); Jan Christoffersson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 274 days.

(21) Appl. No.: 18/271,551

(22) PCT Filed: Jan. 11, 2022

(86) PCT No.: PCT/SE2022/050012
§ 371 (c)(1),
(2) Date: Jul. 10, 2023

(87) PCT Pub. No.: WO2022/154718
PCT Pub. Date: Jul. 21, 2022

(65) Prior Publication Data
US 2024/0073990 A1 Feb. 29, 2024

Related U.S. Application Data

(60) Provisional application No. 63/137,456, filed on Jan. 14, 2021.

(51) Int. Cl.
*H04W 76/27* (2018.01)

(52) U.S. Cl.
CPC ................................. *H04W 76/27* (2018.02)

(58) Field of Classification Search
CPC . H04W 76/27; H04W 76/19; H04W 36/0033; H04W 28/0278; H04W 36/023
See application file for complete search history.

(56) References Cited

U.S. PATENT DOCUMENTS 11,716,779 B2 * 8/2023 Khlass ................... H04W 76/27
370/329
11,864,262 B2 * 1/2024 Liu ........................ H04W 76/25
(Continued)

FOREIGN PATENT DOCUMENTS

WO WO-2018142207 A1 * 8/2018 ............ H04W 76/19
WO 2020074082 A1 4/2020
(Continued)

OTHER PUBLICATIONS

Author Unknown, "Technical Specification Group Radio Access Network; NR; NR and NG-RAN Overall Description; Stage 2 (Release 16)," Technical Specification 38.300, Version 16.3.0, Sep. 2020, 3GPP Organizational Partners, 148 pages.
(Continued)

*Primary Examiner* — Mong-Thuy T Tran
(74) *Attorney, Agent, or Firm* — Withrow & Terranova, PLLC

(57) ABSTRACT

Systems and methods for User Equipment (UE) context retrieval and data forwarding to support Small Data Transmission (SDT) are provided. In some embodiments, a new network node can request an old network node for UE context retrieval and data forwarding if the UE in RRC_INACTIVE state sends small data to the new network node. In some embodiments, the old network node decides whether to relocate the anchor for UE context to the new network node or rejects the relocation. The request includes either or both of (a) an indication that the UE context retrieval is related to a SDT performed by the UE and (b) UE
(Continued)

assistance information that informs the old network node that the UE has started a SDT procedure.

24 Claims, 11 Drawing Sheets

(56)                     References Cited

U.S. PATENT DOCUMENTS

| | | | | |
|---|---|---|---|---|
| 2019/0289661 | A1* | 9/2019 | Chen | H04W 76/27 |
| 2020/0008137 | A1 | 1/2020 | Li et al. | |
| 2020/0022044 | A1* | 1/2020 | Kim | H04W 48/20 |
| 2020/0037210 | A1 | 1/2020 | Rugeland et al. | |
| 2020/0053818 | A1 | 2/2020 | Silanpaa et al. | |
| 2022/0078697 | A1* | 3/2022 | Tseng | H04W 72/21 |
| 2022/0086899 | A1* | 3/2022 | Shih | H04L 5/0053 |
| 2022/0104299 | A1* | 3/2022 | Kim | H04W 48/20 |
| 2022/0124859 | A1* | 4/2022 | Wang | H04W 76/27 |
| 2023/0030443 | A1* | 2/2023 | Chen | H04W 72/23 |
| 2023/0345368 | A1* | 10/2023 | Kim | H04W 48/20 |
| 2024/0306238 | A1* | 9/2024 | Shi | H04W 74/0808 |

FOREIGN PATENT DOCUMENTS

| | | |
|---|---|---|
| WO | 2020189958 A1 | 9/2020 |
| WO | 2020191059 A1 | 9/2020 |
| WO | 2020194171 A1 | 10/2020 |
| WO | 2022242648 A1 | 11/2022 |

OTHER PUBLICATIONS

Author Unknown, "Technical Specification Group Radio Access Network; NR; Radio Resource Control (RRC) protocol specification (Release 16)," Technical Specification 38.331, Version 16.2.0, Sep. 2020, 3GPP Organizational Partners, 921 pages.

Author Unknown, "Technical Specification Group Radio Access Network; NG-RAN; Xn application protocol (XnAP) (Release 16)," Technical Specification 38.423, Version 16.3.0, Sep. 2020, 3GPP Organizational Partners, 451 pages.

Author Unknown, "Technical Specification Group Radio Access Network; NG-RAN; F1 application protocol (F1AP) (Release 16)," Technical Specification 38.473, Version 16.3.0, Sep. 2020, 3GPP Organizational Partners, 455 pages.

Nec, "R2-2009657: Subsequent data transmission for SDT," 3GPP TSG-RAN WG2 #112, Nov. 2-13, 2020, Electronic Meeting, 3 pages.

Zte Corporation, "RP-201305: Work Item on NR smalldata transmissions in Inactive state," 3GPP TSG RAN Meeting #88e, Jun. 29-Jul. 3, 2020, Electronic Meeting, 5 pages.

International Search Report and Written Opinion for International Patent Application No. PCT/SE2022/050012, mailed Apr. 19, 2022, 10 pages.

International Preliminary Report on Patentability for International Patent Application No. PCT/SE2022/050012, mailed Dec. 22, 2022, 13 pages.

Author Unknown, "Third Generation Partnership Project Agreement," 3GPP Draft, 2021, 3GPP Organizational Partners, 45 pages.

Office Action for Colombian Patent Application No. NC2023/0009859, mailed Mar. 13, 2026, 26 pages.

* cited by examiner

RECEIVE A RRCResumeRequest MESSAGE FROM A UE
600

TRANSMIT A REQUEST TO AN OLD NETWORK NODE FOR UE CONTEXT
RETRIEVAL
602

RECEIVE A RESPONSE FROM THE OLD NETWORK NODE
604

RESUME RRC WITH THE UE USING A RETRIEVED UE CONTEXT
606A

RELEASE RRC WITH THE UE
606B

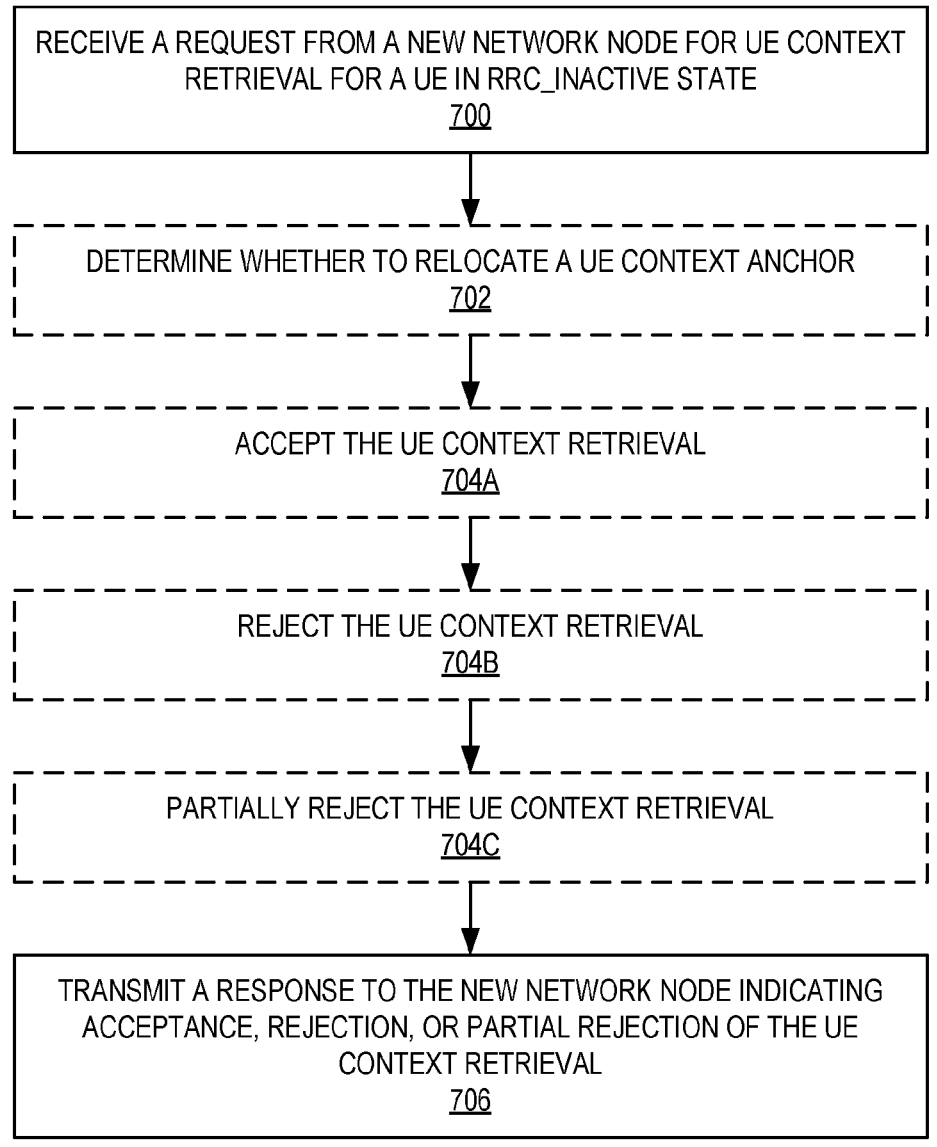

RECEIVE A REQUEST FROM A NEW NETWORK NODE FOR UE CONTEXT
RETRIEVAL FOR A UE IN RRC_INACTIVE STATE
700

DETERMINE WHETHER TO RELOCATE A UE CONTEXT ANCHOR
702

ACCEPT THE UE CONTEXT RETRIEVAL
704A

REJECT THE UE CONTEXT RETRIEVAL
704B

PARTIALLY REJECT THE UE CONTEXT RETRIEVAL
704C

TRANSMIT A RESPONSE TO THE NEW NETWORK NODE INDICATING
ACCEPTANCE, REJECTION, OR PARTIAL REJECTION OF THE UE
CONTEXT RETRIEVAL
706

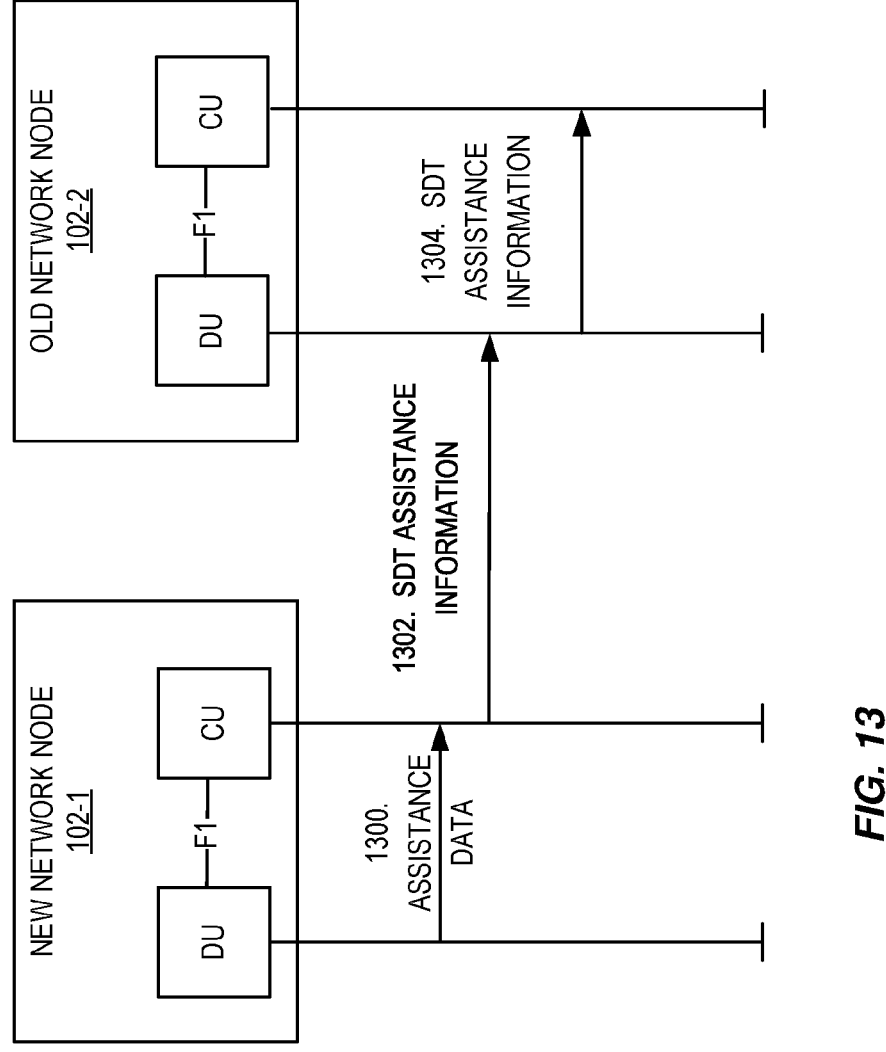
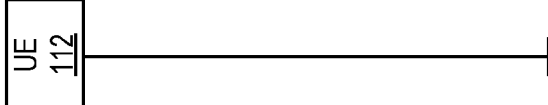
*FIG. 13*

SYSTEMS AND METHODS FOR UE CONTEXT RETRIEVAL AND DATA FORWARDING TO SUPPORT SMALL DATA TRANSMISSION

RELATED APPLICATIONS

This application claims the benefit of provisional patent application Ser. No. 63/137,456, filed Jan. 14, 2021, the disclosure of which is hereby incorporated herein by reference in its entirety.

TECHNICAL FIELD

The present disclosure is directed to systems and methods for User Equipment (UE) context retrieval and data forwarding to support Small Data Transmission (SDT). When a new network node requests an old network node for UE context retrieval and data forwarding if the UE in RRC_INACTIVE state sends small data to the new network node. The old network node then decides whether to relocate an anchor for UE context to the new network node.

BACKGROUND

UE Context Retrieval

Retrieval of User Equipment (UE) context ("Retrieve UE Context procedure") has been introduced to both Long Term Evolution (LTE) and New Radio (NR) specifications from the Third Generation Partnership Project (3GPP). The purpose of the Retrieve UE Context procedure is to retrieve the UE context for a UE which attempts to resume its Radio Resource Control (RRC) connection in an Enhanced or Evolved Node B (eNB)/New Radio Base Station (gNB) (new eNB/gNB) different from another eNB/gNB (old eNB/ gNB) where the RRC connection was suspended. Additionally, the Retrieve UE Context procedure is used for a UE which attempts to re-establish its RRC connection in an eNB/gNB (new eNB/gNB) different from another eNB/gNB (old eNB/gNB) where the RRC connection failed (e.g., due to Radio Link Failure (RLF)).

Furthermore, UE context retrieval (the Retrieve UE Context procedure) is supported in NR RRC_INACTIVE state, which is a state where a UE remains in CM-CONNECTED and can move within an area configured by a Next Generation (NG) Radio Access Network (RAN) (NG-RAN) (the RAN-based Notification Area (RNA)) without notifying the NG-RAN. If the UE accesses a gNB other than the last serving gNB, the receiving gNB triggers a 'Xn Application Protocol (XnAP) Retrieve UE Context procedure' to get the UE context from the last serving gNB and may also trigger a 'Xn-U Address Indication procedure' including tunnel information for potential recovery of data from the last serving gNB. Upon successful UE context retrieval, the receiving gNB shall perform a slice-aware admission control in case of receiving slice information and becomes the serving gNB, and the receiving gNB further triggers a 'NG Application Protocol (NGAP) Path Switch Request' and applicable RRC procedures. After the path switch procedure, the serving gNB triggers a release of the UE context at the last serving gNB by means of the 'XnAP UE Context Release procedure' defined in TS 38.423 (XnAP) spec section 9.1.1.5.

A UE in the RRC_INACTIVE state is required to initiate RNA update procedure when it moves out of the configured RNA. When receiving an RNA update request from the UE, the receiving gNB triggers the XnAP Retrieve UE Context procedure to get the UE context from the last serving gNB and may decide to send the UE back to RRC_INACTIVE state, move the UE into RRC_CONNECTED state, or send the UE to RRC_IDLE. In case of periodic RNA update, if the last serving gNB decides not to relocate the UE context, it fails the Retrieve UE Context procedure and sends the UE back to RRC_INACTIVE, or to RRC_IDLE directly by an encapsulated RRCRelease message.

NR Small Data Transmission in INACTIVE State

A new Work Item (WI) RP-201305 'New Work Item on NR small data transmissions in INACTIVE state' has been approved in 3GPP with the focus of optimizing the transmission for small data payloads by reducing the signaling overhead. The WI contains the following relevant objectives:

This work item enables small data transmission in RRC_INACTIVE state as follows:
For the RRC_INACTIVE state:
UL small data transmissions for RACH-based schemes (i.e., 2-step and 4-step RACH):
General procedure to enable UP data transmission for small data packets from INACTIVE state (e.g., using MSGA or MSG3) [RAN2]
Enable flexible payload sizes larger than the Rel-16 CCCH message size that is possible currently for INACTIVE state for MSGA and MSG3 to support UP data transmission in UL (actual payload size can be up to network configuration) [RAN2]
Context fetch and data forwarding (with and without anchor relocation) in INACTIVE state for RACH-based solutions [RAN2, RAN3]
Note 1: The security aspects of the above solutions should be checked with SA3
Transmission of UL data on pre-configured PUSCH resources (i.e., reusing the configured grant type 1) - when TA is valid
General procedure for small data transmission over configured grant type 1 resources from INACTIVE state [RAN2]
Configuration of the configured grant type1 resources for small data transmission in UL for INACTIVE state [RAN2]
Specify RRM core requirements for small data transmission in RRC_INACTIVE, if needed [RAN4]

For Narrowband Internet of Things (NB-IoT) and LTE Machine Type Communication (LTE-M), similar signaling optimizations for small data have been introduced through Release 15 (Rel-15) Early Data Transmission (EDT) and Release 16 (Rel-16) Preconfigured Uplink Resources (PUR). Somewhat similar solutions could be expected for NR with the differences that the Release 17 (Rel-17) NR Small Data Transmission (SDT) (a) is only to be supported for RRC INACTIVE state, (b) includes also 2-step Random Access Channel (RACH) based small data, and (c) includes regular complexity Mobile Broadband (MBB) UEs. Both of the Rel-15 EDT and the Rel-17 SDT support Mobile Originated (MO) traffic only.

The WI has started in 3GPP meeting RAN2 #111-e, and the following relevant agreements have already been made:

Small data transmission with RRC message is supported as a baseline for Random Access (RA)-based and Cell Group (CG)-based schemes.

The 2-step RACH or 4-step RACH should be applied to RACH-based uplink small data transmission in RRC_I-NACTIVE.

The uplink small data can be sent in msgA of 2-step RACH or msg3 of 4-step RACH.

Small Data Transmission (SDT) is configured by the network on a per Data Radio Bearer (DRB) basis.

Data volume threshold is used for the UE to decide whether to do SDT or not. For further study how to calculate data volume.

For further study if an "additional SDT specific" RSRP threshold is further used to determine whether the UE should do SDT.

Uplink (UL)/Downlink (DL) transmission following UL SDT without transitioning to RRC_CONNECTED is supported.

When UE is in RRC_INACTIVE, it should be possible to send multiple UL and DL packets as part of the same SDT mechanism and without transitioning to RRC_CONNECTED on dedicated grant. For further study on details and whether any indication to network is needed.

In RAN2 #112-e, and the following agreements have been made:

---

Agreements:

The configuration of configured grant resource for UE uplink small data transfer is contained in the RRCRelease message. FFS if other dedicated messages can configure CG in INACTIVE CG. Configuration is only type 1 CG with no contention resolution procedure for CG.

The configuration of configured grant resource can include one type 1 CG configuration. FFS if multiple configured CGs are allowed A new TA timer for TA maintenance specified for configured grant based small data transfer in RRC_INACTIVE should be introduced. FFS on the procedure, the validity of TA, and how to handle expiration of TA timer. The TA timer is configured together with the CG configuration in the RRCRelease message.

The configuration of configured grant resource for UE small data transmission is valid only in the same serving cell. FFS for other CG validity criteria (e.g., timer, UL/SUL aspect, etc)

The UE can use configured grant based small data transfer if at least the following criteria is fulfilled (1) user data is smaller than the data volume threshold; (2) configured grant resource is configured and valid; (3) UE has valid TA. FFS for the candidate beam criteria.

From RAN2 point of view: An association between CG resources and SSBs is required for CG-based SDT. FFS up to RAN1 how the association is configured or provided to the UE. Send an LS to RAN1 to start the discussion on how the association can be made. Mention that one option RAN2 considered was explicit configuration with RRC Release message A SS-RSRP threshold is configured for SSB selection. UE selects one of the SSB with SS-RSRP above the threshold and selects the associated CG resource for UL data transmission.

---

Also, RAN2 has sent the following agreements to RAN3 for consideration of network signaling.

---

Agreements:

Context fetch and data forwarding with anchor re-location and without anchor re-location will be considered (RAN2 #111e).

From RAN2 perspective, stored "configuration" in the UE Context is used for the RLC bearer configuration for any SDT mechanism (RACH and CG) (RAN2 #111e).

The configuration of configured grant resource for UE small data transmission is valid only in the same serving cell (RAN2 #112e).

UL/DL transmission following UL SDT without transitioning to RRC_CONNECTED is supported (RAN2 #111e).

When UE is in RRC_INACTIVE, it should be possible to send multiple UL and DL packets as part of the same SDT mechanism and without transitioning to RRC_CONNECTED on dedicated grant (RAN2 #111e).

For both RACH and CG based solutions, new keys are generated using the stored security context and the NCC value received in the previous RRCRelease message (i.e., same as legacy procedure) and these new keys are used for generating the data of DRBs that are configured for SDT (RAN2 #112e).

---

SUMMARY

Systems and methods for User Equipment (UE) context retrieval and data forwarding to support Small Data Transmission (SDT) are provided. In some embodiments, a method performed by a network node for retrieving UE context comprises receiving a Radio Resource Control (RRC) resume request message from a UE, transmitting a request to an old network node for UE context retrieval, and receiving a response from the old network node. The request includes either or both of (a) an indication that the UE context retrieval is related to a Small Data Transmission (SDT) performed by the UE and (b) UE assistance information that informs the old network node that the UE has started a SDT procedure. In this way, the standardization of New Radio (NR) SDT is supported.

In some embodiments, the UE assistance information comprises a buffer status reporting.

In some embodiments, the UE assistance information comprises information that the UE intends to send subsequent data after transmitting initial data using the SDT with Radio Resource Control, RRC, signaling.

In some embodiments, the network node transmits assistance data necessary for sending the UE assistance information to the old network node before receiving the RRC resume request message from the UE.

In some embodiments, the RRC resume request message comprises a request for resumption of a suspended Radio Resource Control connection.

In some embodiments, the RRC resume request message comprises a request to perform a Radio Access Network (RAN)-based Notification Area (RNA) update.

In some embodiments, transmitting the request to the old network node for retrieval of the UE context comprises a RETRIEVE UE CONTEXT REQUEST with an indicator for SDT.

In some embodiments, the response from the old network node indicates the UE context retrieval is accepted. In some embodiments, the response from the old network node comprises a RETRIEVE UE CONTEXT RESPONSE message. In some embodiments, the method further comprises resuming Radio Resource Control (RRC) with the UE using a retrieved UE context. In some embodiments, resuming RRC with the UE comprises sending a RRCResume message to the UE.

In some embodiments, the response from the old network node indicates the UE context retrieval is rejected. In some embodiments, the response from the old network node comprises a RETRIEVE UE CONTEXT FAILURE message. In some embodiments, the RETRIEVE UE CONTEXT FAILURE message has a cause value for SDT.

In some embodiments, the response from the old network node indicates the UE context retrieval is partially rejected. In some embodiments, the response from the old network node comprises a part of the UE context in a RETRIEVE UE CONTEXT RESPONSE message. In some embodiments, the response from the old network node comprises a part of the UE context in a RETRIEVE UE CONTEXT FAILURE message.

In some embodiments, the method further comprises releasing RRC with the UE. In some embodiments, releasing RRC with the UE comprises sending a RRCRelease message to the UE.

In some embodiments, a method performed by a network node for forwarding UE context comprises receiving a request from a new network node for UE context retrieval for a UE in RRC_INACTIVE state and transmitting a response to the new network node indicating acceptance, rejection, or partial rejection of the UE context retrieval. The request includes either or both of (a) an indication that the UE context retrieval is related to a Small Data Transmission (SDT) performed by the UE and (b) UE assistance information that informs the old network node that the UE has started a SDT procedure.

In some embodiments, the UE assistance information comprises a buffer status reporting.

In some embodiments, the method of claim 1, wherein the UE assistance information comprises information that the UE intends to send subsequent data after transmitting initial data using the SDT with Radio Resource Control, RRC, signaling.

In some embodiments, the network node transmits assistance data necessary for sending the UE assistance information to the old network node before receiving the RRC resume request message from the UE.

In some embodiments, the request from the new network node comprises a RRC container with assistance information.

In some embodiments, the request from the new network node comprises a RRC container with an indicator of SDT.

In some embodiments, the method further comprises determining whether to relocate a UE context anchor based on information in the RRC container.

In some embodiments, the request from the new network node comprises a RETRIEVE UE CONTEXT REQUEST.

In some embodiments, the further comprises accepting the UE context retrieval, wherein the response to the new network node comprises a RETRIEVE UE CONTEXT RESPONSE message.

In some embodiments, the further comprises rejecting the UE context retrieval, wherein the response to the new network node comprises a RETRIEVE UE CONTEXT FAILURE message. In some embodiments, the RETRIEVE UE CONTEXT FAILURE message has a cause value for SDT.

In some embodiments, the method further comprises partially rejecting the UE context retrieval. In some embodiments, the response to the new network node comprises a part of the UE context in a RETRIEVE UE CONTEXT RESPONSE message. In some embodiments, the response to the new network node comprises a part of the UE context in a RETRIEVE UE CONTEXT FAILURE message.

Corresponding embodiments of the network node are also disclosed.

In some embodiments, a network node is adapted to receive a RRC resume request message from a UE, transmit a request to an old network node for UE context retrieval, and receive a response from the old network node. The request includes either or both of (a) an indication that the UE context retrieval is related to a Small Data Transmission (SDT) performed by the UE and (b) UE assistance information that informs the old network node that the UE has started a SDT procedure.

In some embodiments, a network node comprising processing circuitry is configured to cause the network node to receive a RRC resume request message from a UE, transmit a request to an old network node for UE context retrieval, and receive a response from the old network node. The request includes either or both of (a) an indication that the UE context retrieval is related to a Small Data Transmission (SDT) performed by the UE and (b) UE assistance information that informs the old network node that the UE has started a SDT procedure.

In some embodiments, a network node is adapted to receive a request from a new network node for UE context retrieval for a UE in RRC_INACTIVE state and transmit a response to the new network node indicating acceptance, rejection, or partial rejection of the UE context retrieval. The request includes either or both of (a) an indication that the UE context retrieval is related to a Small Data Transmission (SDT) performed by the UE and (b) UE assistance information that informs the old network node that the UE has started a SDT procedure.

In some embodiments, a network node comprising processing circuitry is configured to cause the network node to receive a request from a new network node for UE context retrieval for a UE in RRC_INACTIVE state and transmit a response to the new network node indicating acceptance, rejection, or partial rejection of the UE context retrieval. The request includes either or both of (a) an indication that the UE context retrieval is related to a Small Data Transmission (SDT) performed by the UE and (b) UE assistance information that informs the old network node that the UE has started a SDT procedure.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 7 a flow diagram of a process for forwarding UE context in accordance with some embodiments of the present disclosure.

FIG. 13 illustrates that a network node comprises a distributed unit (DU) and a central unit (CU) and the DU sends assistance data to the CU.

DETAILED DESCRIPTION

Figure 1:
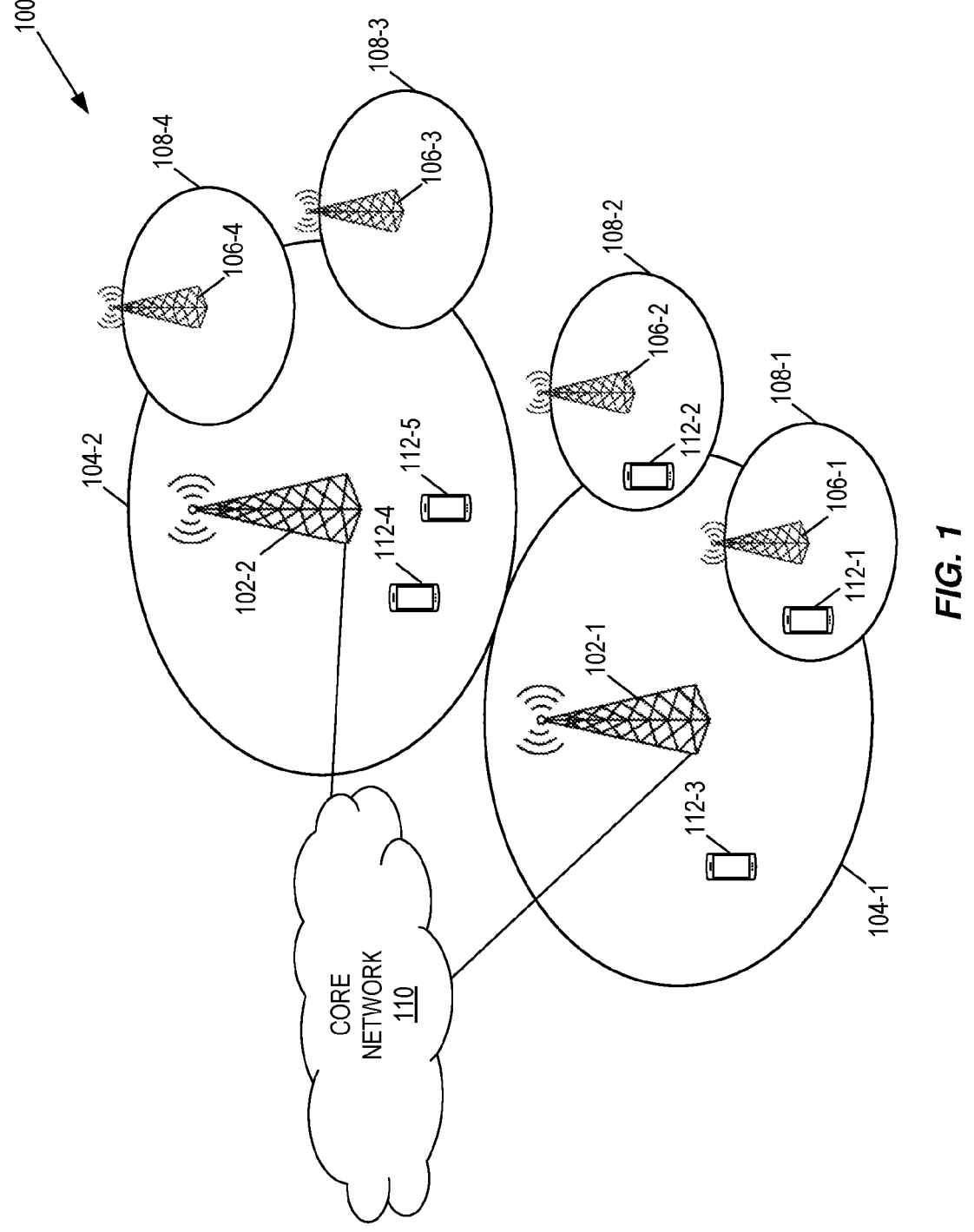
FIG. 1 illustrates one example of a cellular communications system.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 11:
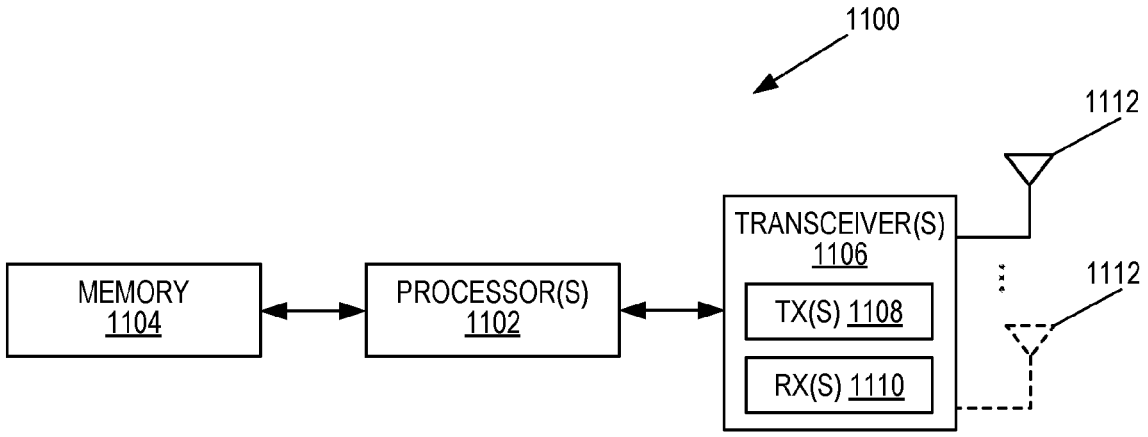
FIG. 11 is a schematic block diagram of a wireless communication device 1100 node in accordance with some embodiments of the present disclosure.

FIG. 11 illustrates one example of a cellular communications system 1100 in which embodiments of the present disclosure may be implemented. In the embodiments described herein, the cellular communications system 1100 is a 5G System (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC). In this example, the RAN includes base stations 1102-1 and 1102-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 1104-1 and 1104-2. The base stations 1102-1 and 1102-2 are generally referred to herein collectively as base stations 1102 and individually as base station 1102. Likewise, the (macro) cells 1104-1 and 1104-2 are generally referred to herein collectively as (macro) cells 1104 and individually as (macro) cell 1104. The RAN may also include a number of low power nodes 1106-1 through 1106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

Figure 2:
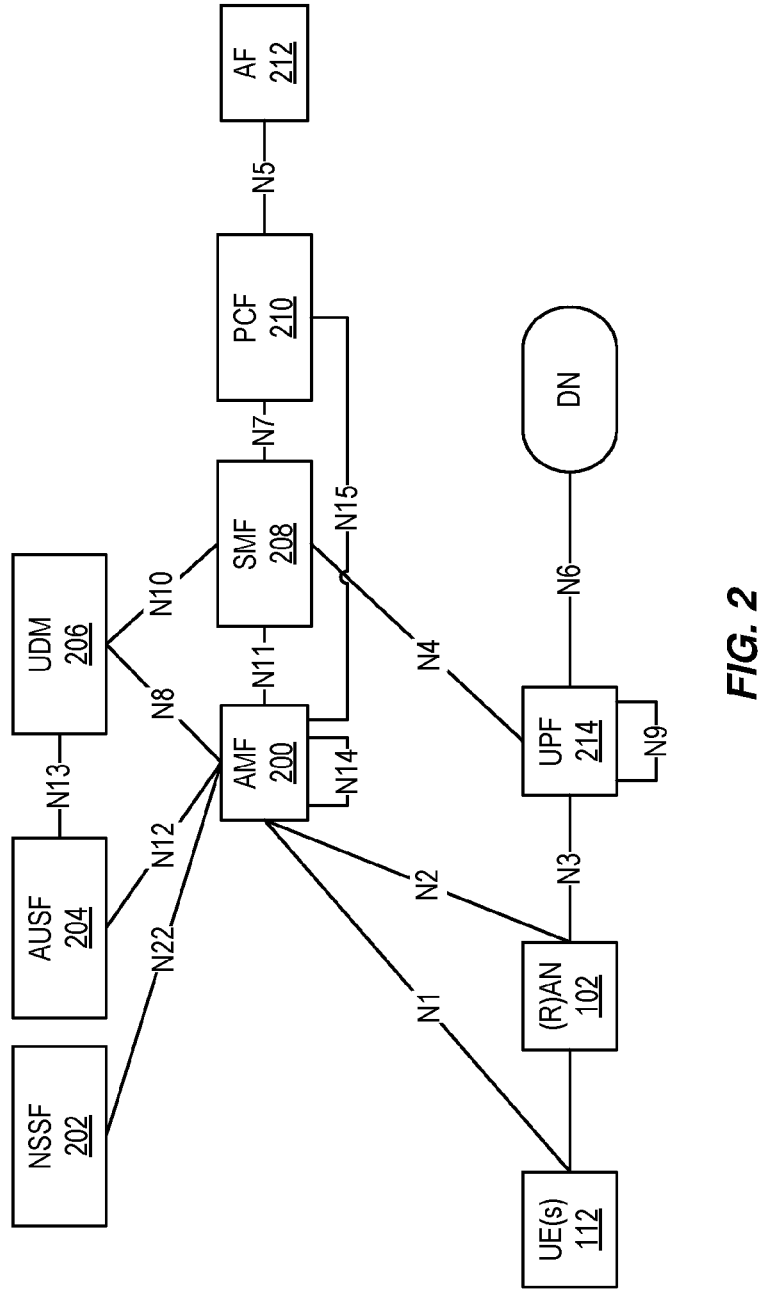
FIG. 2 illustrates a wireless communication system represented as a Fifth Generation (5G) network architecture composed of core Network Functions (NFs).

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs 112 connected to either a RAN 102 or an Access Network (AN) as well as an AMF 200. Typically, the R(AN) 102 comprises base stations, e.g., such as eNBs or gNBs or similar. Seen from the core network side, the 5GC NFs shown in FIG. 2 include a NSSF 202, an AUSF 204, a UDM 206, the AMF 200, a SMF 208, a PCF 210, and an Application Function (AF) 212.

Reference point representations of the 5G network architecture are used to develop detailed call flows in the normative standardization. The N1 reference point is defined to carry signaling between the UE 112 and AMF 200. The reference points for connecting between the (R)AN 102 and AMF 200 and between the (R)AN 102 and UPF 214 are defined as N2 and N3, respectively. There is a reference point, N11, between the AMF 200 and SMF 208, which implies that the SMF 208 is at least partly controlled by the AMF 200. N4 is used by the SMF 208 and UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and SMF 208, respectively. N12 is required for the AMF 200 to perform authentication of the UE 112. N8 and N10 are defined because the subscription data of the UE 112 is required for the AMF 200 and SMF 208.

The 5GC network aims at separating User Plane (UP) and Control Plane (CP). The UP carries user traffic while the CP carries signaling in the network. In FIG. 2, the UPF 214 is in the UP and all other NFs, i.e., the AMF 200, SMF 208, PCF 210, AF 212, NSSF 202, AUSF 204, and UDM 206, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RU) between UEs and data network for some applications requiring low latency.

The core 5G network architecture is composed of modularized functions. For example, the AMF 200 and SMF 208 are independent functions in the CP. Separated AMF 200 and SMF 208 allow independent evolution and scaling. Other CP functions like the PCF 210 and AUSF 204 can be separated as shown in FIG. 2. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 3:
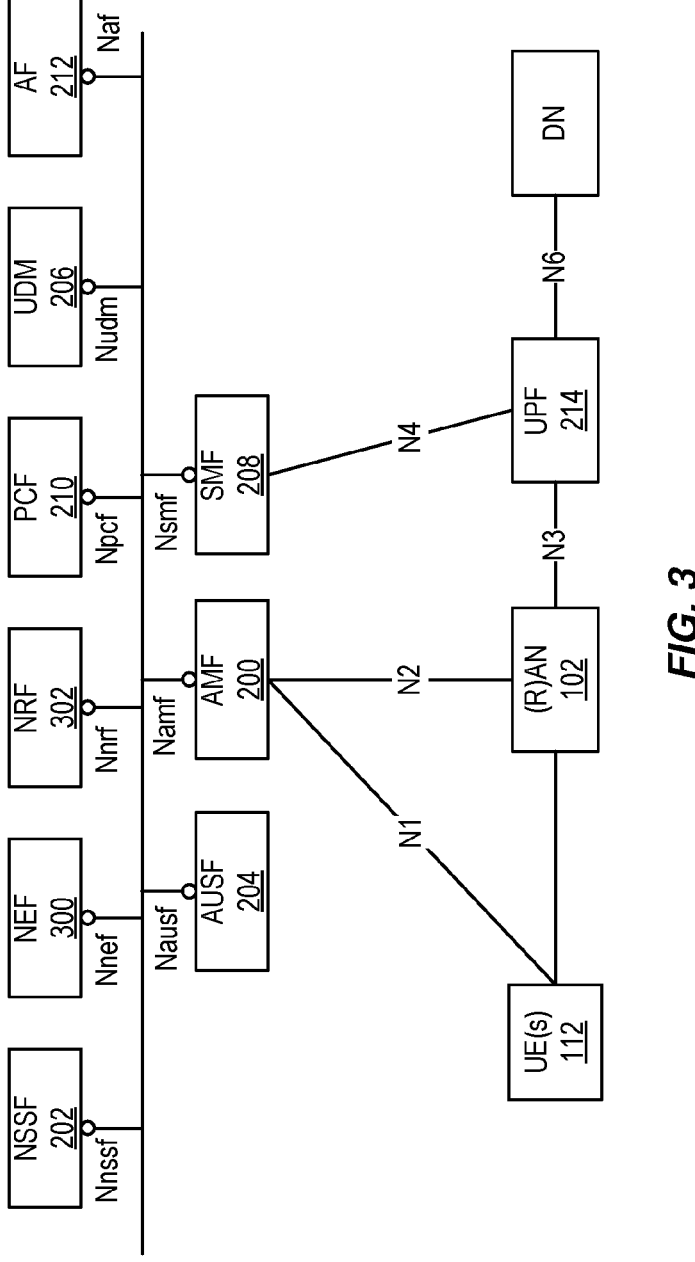
FIG. 3 illustrates a 5G network architecture using service-based interfaces between the NFs in the Control Plane (CP).

FIG. 3 illustrates a 5G network architecture using service-based interfaces between the NFs in the CP, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g., Namf for the service based interface of the AMF 200 and Nsmf for the service based interface of the SMF 208, etc. NEF 300 and NRF 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates Internet Protocol (IP) addresses to UEs. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support Quality of Service (QoS). Based on the information, the PCF 210 determines policies about mobility and session management to make the AMF 200 and SMF 208 operate properly. The AUSF 204 supports authentication function for UEs or similar and thus stores data for authentication of UEs or similar while the UDM 206 stores subscription data of the UE 112. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

There currently exist certain challenge(s). When UE context retrieval is executed for the UE in RRC INACTIVE state, the old serving NG-RAN node needs to decide whether to relocate the anchor to the new NG-RAN node with Small Data Transmission (SDT) from UE. Currently, these procedures are not taken into account in existing specifications and solutions need to be provided.

Certain aspects of the present disclosure and their embodiments may provide solutions to the aforementioned or other challenges. Systems and methods for UE context retrieval and data forwarding to support Small Data Transmission (SDT) are provided. Embodiments provide support of SDT when the UE is in RRC_INACTIVE state with and without anchor relocation. In some embodiments, a new network node (e.g., a base station 102 or another network node implementing one or more NFs) can request an old network node (e.g., another base station 102 or network node) for UE context retrieval and data forwarding if the UE in RRC_INACTIVE state sends small data to the new network node. In some embodiments, the old network node decides whether to relocate the anchor for UE context to the new network node or rejects the relocation. Certain embodiments may provide one or more of the following technical advantage(s). Embodiments support standardization of New Radio (NR) SDT. Further, embodiments re-use existing Xn Application Protocol (XnAP) signaling such that the UE side is not impacted.

Context Retrieval with/without Anchor Relocation

Figure 4:
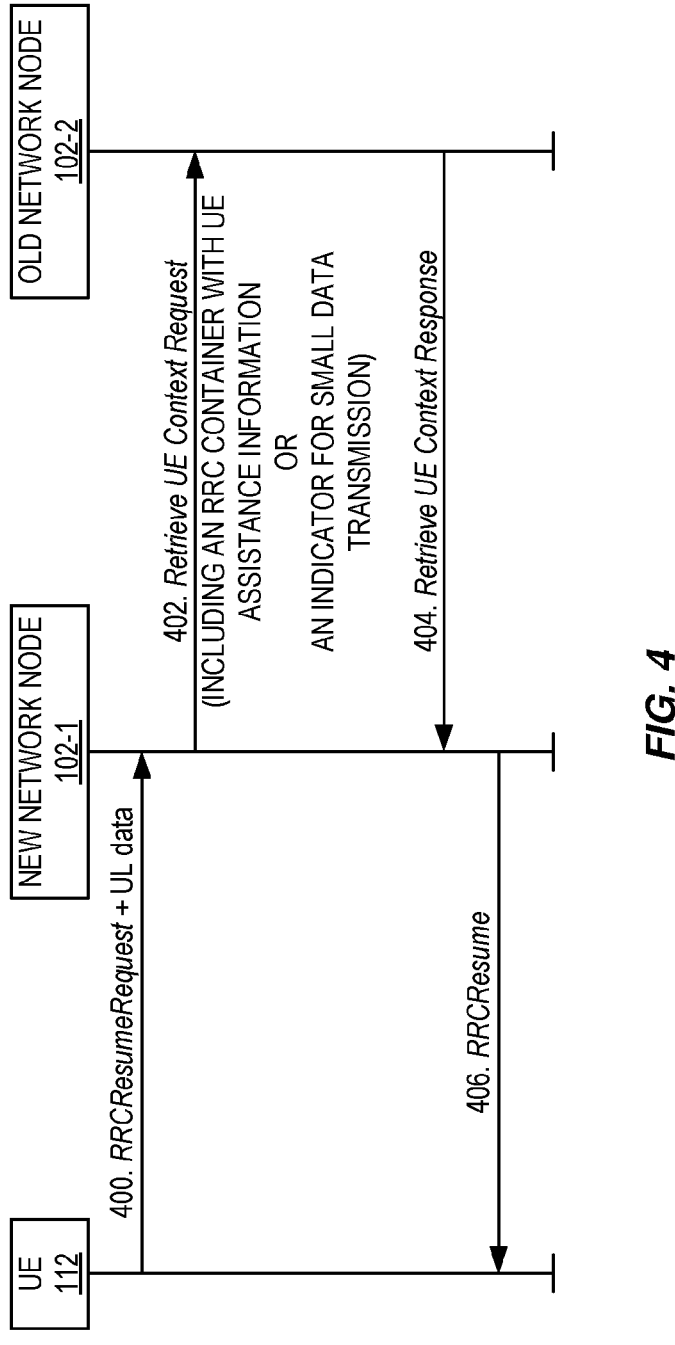
FIG. 4 is a flow diagram illustrating steps of a new network node initiating a request for User Equipment (UE) context retrieval where an old network node accepts anchor relocation in accordance with some embodiments of the present disclosure.
Figure 5:
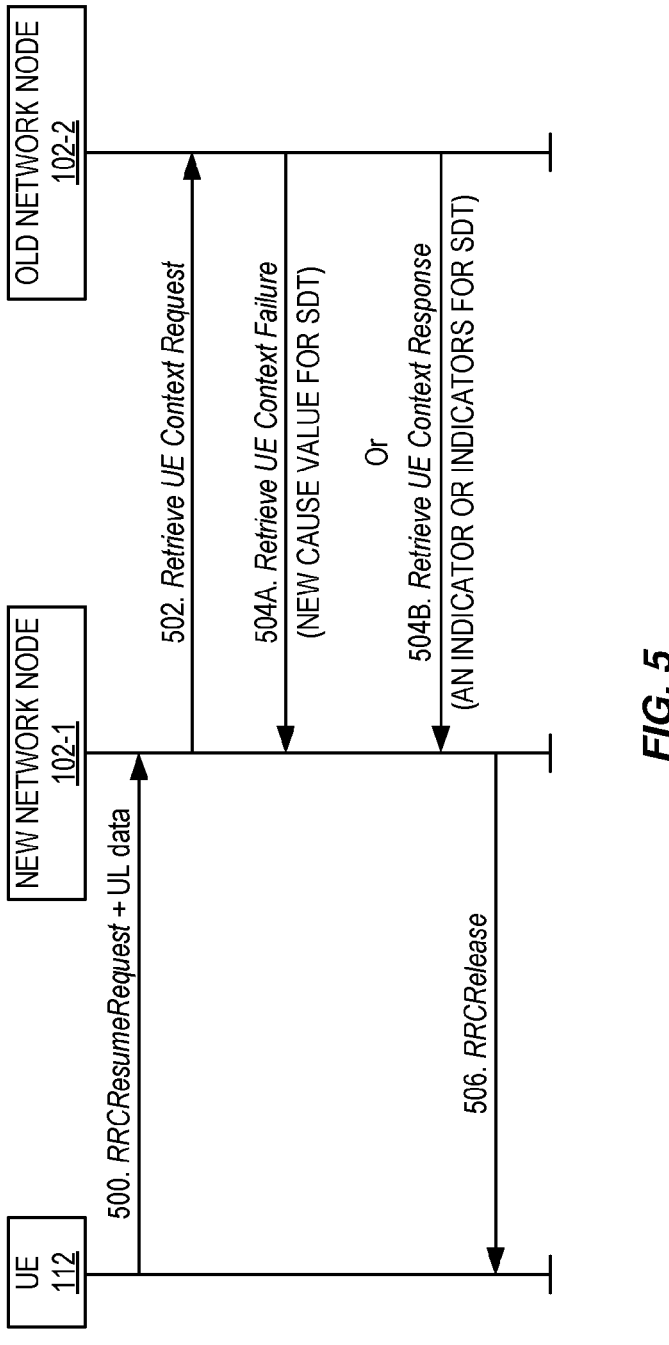
FIG. 5 is a flow diagram illustrating steps of the new network node initiating a request for UE context retrieval where the old network node rejects anchor relocation in accordance with some embodiments of the present disclosure.

FIG. 4 is a flow diagram illustrating steps of a new network node 102-1 initiating a request for UE context retrieval where an old network node 102-2 accepts anchor relocation. FIG. 5 is a flow diagram illustrating steps of the new network node 102-1 initiating a request for UE context retrieval where the old network node 102-2 rejects anchor relocation.

With reference to FIGS. 4 and 5, embodiments described herein include a method executed by the new network node, the method comprising:

Receiving a RRC resume request message from the UE 112 (block 400, 500). This message contains a request for the resumption of a suspended RRC connection or to perform an RNA update.

Transmitting a request to an old network node 102-2 for context retrieval of the UE Application Server (AS) context (block 402, 502).

The request being RETRIEVE UE CONTEXT REQUEST with a new indicator or new indications for SDT.

Receiving a response from the old network node 102-2 where the UE context fetch is accepted or rejected (block 404, 504A, 504B).

In one scenario, the old network node 102-2 accepts the UE context retrieval that the new network node 102-1 has requested. The acceptance may be indicated by the new network node 102-1 receiving an acknowledge message, e.g., a RETRIEVE UE CONTEXT RESPONSE message (block 404).

In another scenario the old network node 102-2 does not accept the UE context retrieval that the new network node 102-1 has requested. The rejection is indicated by the new network node 102-1 receiving a RETRIEVE UE CONTEXT FAILURE message with a new cause value for SDT (block 504A).

In another scenario, the old network node 102-2 does not accept the UE context retrieval that the new network node 102-1 has requested. Instead, it supplies only parts of the UE context to the new network node 102-1. This partial rejection can be indicated either by e.g., a new indication related to the partial UE context in the RETRIEVE UE CONTEXT RESPONSE message (block 504B) or in the RETRIEVE UE CONTEXT FAILURE message (block 504A).

In alternative, a RETRIEVE UE CONTEXT FAILURE does not include a cause value for SDT as this can e.g., be implicitly assumed from the context relocation initiation upon receiving an SDT indication in the RETRIEVE UE CONTEXT REQUEST message (block 504A).

Transmitting a RRCResume message (block 406) or RRCRelease message (block 506) to the UE 112.

With continuing reference to FIGS. 4 and 5, embodiments described herein include a method executed by an old network node 102-2, the method comprising:

Receiving a request from a new network node 102-1 for context retrieval of the UE 112 in RRC_INACTIVE state (block 402, 502) including an RRC container with assistance information or an indicator of SDT (new indications) to determine whether to relocate the UE context anchor based on the received information.

Transmitting a response to the new network node 102-1 in which the request of context retrieval is accepted or rejected (block 404, 504A, 504B).

In one scenario, the old network node 102-2 has accepted the context retrieval that the new network node 102-1 requested. The acceptance may be indicated to the old network node 102-2 by an acknowledge message, e.g., a RETRIEVE UE CONTEXT RESPONSE message (block 404).

In another scenario, transmitting a response to the new network node 102-1 where the request of UE context retrieval is rejected. The rejection is indicated in RETRIEVE UE CONTEXT FAILURE, possibly together with a new cause value (block 504A).

In alternative, the old node when sending a RETRIEVE UE CONTEXT FAILURE does not include any cause value for SDT (block 504A).

another scenario, transmitting a response to the new network node 102-1 where the request of UE context retrieval is not accepted but SDT procedure is continued without the (full) context retrieval. This is indicated in RETRIEVE UE CONTEXT RESPONSE to the new network node 102-1 (block 504B).

another scenario, transmitting a response to the new network node 102-1 where the request of UE context retrieval is partially rejected. This partial rejection is indicated either by e.g., a RETRIEVE UE CONTEXT RESPONSE message (block 504B) or in a RETRIEVE UE CONTEXT FAILURE message (block 504A). When the old network node 102-2 partially rejects the new network node's request, it will send only parts of the UE context to the new network node 102-1.

| | |
|---|---|
| Anchor is not relocated due to small data transmission | The action failed because the requested anchor relocation for small data transmission could not be fulfilled. |

In one embodiment, the indicator of SDT included in the Xn-AP signaling comprises presence of such field. In one embodiment the new network node 102-1 includes the small data indicator and/or assistance information in Xn-AP signaling when it understands the started procedure is for a SDT procedure.

In one embodiment, the SDT indicator or assistance information informs the old network node 102-2 that the UE 112 has started a SDT procedure. This indicator or information can be sent e.g., in the cases the UE 112 used the configured resources for SDT and includes data so that the gNB understands the UE 112 has initiated a SDT procedure (e.g., includes data in Msg3).

In one embodiment, the assistance information includes the buffer status reporting as included by the UE 112 in the signaling from the UE 112 to the new network node 102-1 (the new gNB).

In another embodiment, the assistance information includes information that the UE 112 is intending to send subsequent data after transmitting the initial data using SDT together with RRC signaling.

In one embodiment, the assistance information includes information from the receiving network node that subsequent SDTs are expected.

In one embodiment, the assistance information includes information related to the Data Radio Bearer (DRB) or DRBs on which SDT is requested or expected. This information may then relate to for example the QoS and/or traffic characteristics of the data over SDT.

In one embodiment, the assistance information includes at least part of the RRC configuration parameters relevant for SDT.

In one embodiment, the assistance information includes any parameters relevant for SDT not necessarily signaled from RRC (e.g., from 5GC).

In one embodiment, the context retrieval request to the old network node 102-2 includes the data Protocol Data Unit (PDU) or parts of the data PDU.

In one embodiment, the UE 112 includes information on the security context, algorithm and/or ciphering keys e.g., $K_{gNB}$, alternatively $K_{upInt}$ at the old network node 102-2 from where some or all are included in the assistance information sent with the context retrieval request message to the old network node 102-2.

In one embodiment, the partial UE context sent to the new network node 102-1 by the old network node 102-2 includes at least part of the RRC configuration parameters relevant for SDT.

In another embodiment, the partial UE context sent to the new network node 102-1 by the old network node 102-2 includes at least part of the Radio Link Control (RLC) configuration parameters relevant for SDT.

In one embodiment the partial UE context sent to the new network node 102-1 by the old network node 102-2 includes information on the security context, algorithm and/or ciphering keys e.g., $K_{gNB}$, alternatively $K_{upInt}$.

In one embodiment, the assistance information includes information from the new network node 102-1 on its preference on whether it would like to perform a context retrieval and path switch. The old network node 102-2 may use this assistance information when deciding whether to transfer the UE context to the new network node 102-1 or not.

In another embodiment, the assistance data necessary for sending the SDT assistance information (or F1 indicator) to the old network node 102-2 (which can be provided by MAC or RLC levels), is signaled beforehand via the existing F1 UE Context Management Functions in the new network node 102-1. This embodiment is further explained below and illustrated in FIG. 13. The F1 interface is the interface between the gNB-CU and the gNB-DU. Thus, in the description of this embodiment, the new network node 102-1 is a new gNB including a gNB-CU and a gNB-DU. In step 1300, the gNB-DU of the new gNB sends "assistance data" (necessary for sending the SDT assistance information) to the gNB-CU of the new gNB. In step 1302, the gNB-CU of the new gNB uses the assistance data to provide the SDT assistance information to the old gNB. Further, in step 1304, the SDT assistance information may be transmitted by the gNB-DU of the old gNB to the gNB-CU of the old gNB. After the SDT assistance information is transmitted from the new gNB (i.e., from the gNB-CU of the new gNB) to the old gNB, the steps 500-506 (illustrated in FIG. 5) may be performed.

Example Implementation in 3GPP TS 38.423

Some embodiments may be implemented in 3GPP Technical Specification (TS) 38.423. An example of such an implementation is illustrated below, with changes underlined.

8.2.4.2 Successful Operation

If the SDT assistance information (or SDT indicator) IE is contained in the RETRIEVE UE CONTEXT REQUEST message, the old NG-RAN node shall, if supported, store this information and take it into account when performing the requested UE context retrieval for small data transmission.

If the old NG-RAN node decides to provide the UE context partially to the new NG-RAN node for small data transmission, it shall include the SDT Context Indicator IE set to "partial" when responding to the new NG-RAN node with the RETRIEVE UE CONTEXT RESPONSE message. If the old NG-RAN node decides to provide the UE context fully to the new NG-RAN node for small data transmission, it shall include the SDT Context Indicator IE set to "full" when responding to the new NG-RAN node with the RETRIEVE UE CONTEXT RESPONSE message.

9.1.1.8 Retrieve UE Context Request

This message is sent by the new NG-RAN node to request the old NG-RAN node to transfer the UE Context to the new NG-RAN.

Direction: new NG-RAN node→old NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| New NG-RAN node UE XnAP ID reference | M | | NG-RAN node UE XnAP ID 9.2.3.16 | Allocated at the new NG-RAN node | YES | reject |
| UE Context ID | M | | 9.2.3.40 | | YES | reject |
| Integrity protection | M | | BIT STRING (SIZE (16)) | RRC Resume: ResumeMAC-I either contained in the RRCResume Request or the RRCResume Request1 message as defined in TS 38.331 [10]) or the Short ResumeMAC-I in the RRC Connection ResumeRequest message as defined in TS 36.331 [14]) RRC Re-establishment: ShortMAC-I contained in the RRCReestablish-mentRequest as defined in TS 38.331 [10]) or the ShortMAC-I in the RRCConnection Reestablishment Request message as defined in TS 36.331 [14]). RRC Resume for UP CIoT Optimization: ShortResume MAC-I in the RRCConnection ResumeRequest message or RRCConnection ResumeRequest-NB message as defined in TS 36.331 [14]. | YES | reject |
| New Cell Identifier | M | | NG-RAN Cell Identity 9.2.2.9 | RRC Resume: Corresponds to the targetCell Identity within the VarResumeMAC-Input as specified in TS 38.331 [10] or the cellIdentity within the VarShortINACTIV E-MAC-Input as specified in TS 36.331 [14]. RRC Re-establishment: Corresponds to the targetCell Identity within the VarShortMAC-Input as specified | YES | reject |

-continued

| IE/Group Name | Presence | Range | IE type and reference | Semantics description | Criticality | Assigned Criticality |
|---|---|---|---|---|---|---|
| | | | | in TS 38.331 [10] or the cellIdentity within the VarShortMAC-Input as specified in TS 36.331 [14]. RRC Resume for UP CIoT Optimization: Corresponds to the cellIdentity within the VarShortResume MAC-Input or VarShortResume MAC-Input-NB as specified in TS 36.331 [14]. | | |
| RRC Resume Cause | O | | 9.2.3.61 | In case of RNA Update, contains the cause value provided by the UE in the RRCResume Request or the RRCResume Request1 message, as defined in TS 38.331 [10], or in the RRCConnection ResumeRequest message, as defined in TS 36.331 [14]. | YES | ignore |
| SDT assistance information/ or SDT indicator | O | | BIT STRING Or ENUMERATED (true, . . . ) | In case of small data transmission, contains the UE Assistance Information in the RRCResume Request or the RRCResume Request1 message, as defined in TS 38.331 [10]. Or this indicates that the UE context retrieval for small data transmission is requested. | YES | ignore |

9.1.1.9 Retrieve UE Context Response

This message is sent by the old NG-RAN node to transfer the UE context to the new NG-RAN node.

Direction: old NG-RAN node→new NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| New NG-RAN node UE XnAP ID reference | M | | NG-RAN node UE XnAP ID 9.2.3.16 | Allocated at the new NG-RAN node | YES | ignore |
| Old NG-RAN node UE | M | | NG-RAN node UE | Allocated at the old NG-RAN node | YES | ignore |

-continued

| XnAP ID reference | | XnAP ID 9.2.3.16 | | | |
|---|---|---|---|---|---|
| GUAMI | M | 9.2.3.24 | | YES | reject |
| UE Context Information - Retrieve UE Context Response | M | 9.2.1.13 | | YES | reject |
| Trace Activation | O | 9.2.3.55 | | YES | ignore |
| Masked IMEISV | O | 9.2.3.32 | | YES | ignore |
| Location Reporting Information | O | 9.2.3.47 | Includes the necessary parameters for location reporting. | YES | ignore |
| Criticality Diagnostics | O | 9.2.3.3 | | YES | ignore |
| NR V2X Services Authorized | O | 9.2.3.105 | | YES | ignore |
| LTE V2X Services Authorized | O | 9.2.3.106 | | YES | ignore |
| PC5 QoS Parameters | O | 9.2.3.109 | This IE applies only if the UE is authorized for NR V2X services. | YES | ignore |
| UE History Information | O | 9.2.3.64 | | YES | ignore |
| UE History Information from the UE | O | 9.2.3.110 | | YES | ignore |
| Management Based MDT PLMN List | O | MDT PLMN List 9.2.3.133 | | YES | ignore |
| SDT Context Indicator | O | ENUMERATED (full, partial, ... ) | Indicates that the UE context is fully or partially retrieved. | YES | ignore |
| SDT Partial UE Context Information | O | 9.2.1.13 | This IE is only present when the SDT Context Indicator IE is set to 'partial' | YES | ignore |

| Range bound | Explanation |
|---|---|
| maxnoofMDTPLMNs | PLMNs in the Management Based MDT PLMN list. Value is 16. |

Figure 6:
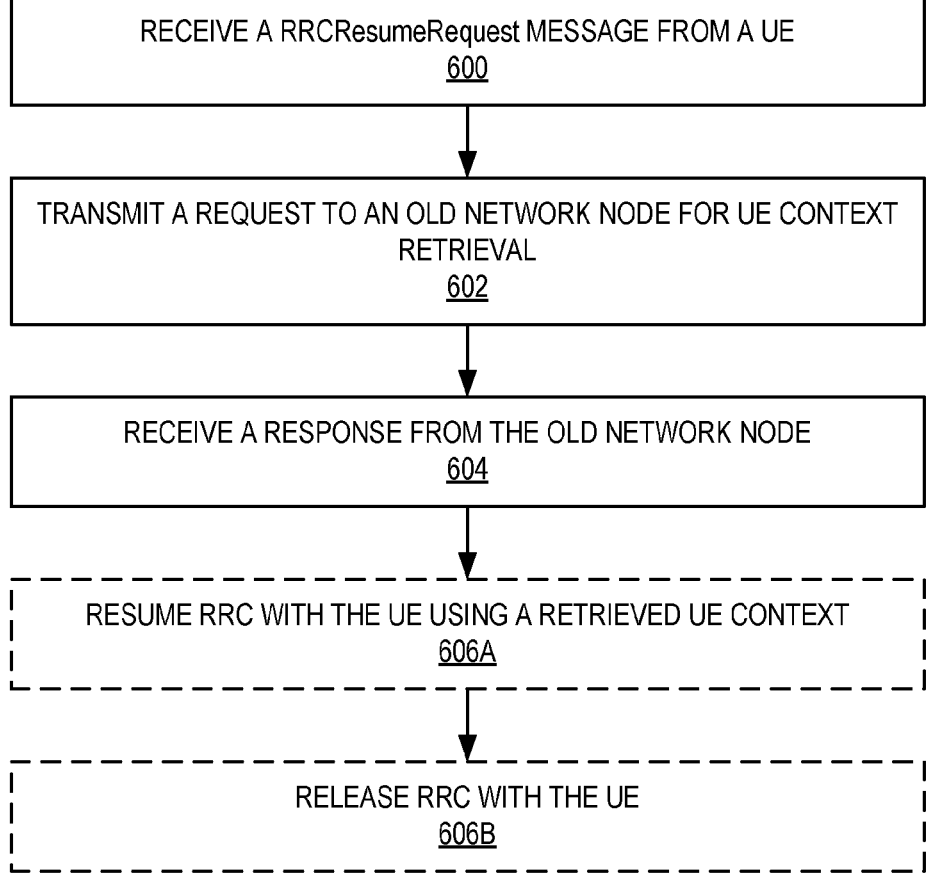
FIG. 6 is a flow diagram of a process for retrieving UE context in accordance with some embodiments of the present disclosure.

FIG. 6 is a flow diagram of a process for retrieving UE context. In some embodiments, the method is performed by a new network node 102-1. The method begins at step 600, with receiving a RRCResumeRequest ("RRC resume request") message from a UE 112. The method continues at step 602, with transmitting a request to an old network node 102-2 for UE context retrieval. The method continues at step 604, with receiving a response from the old network node 102-2.

The method optionally continues at step 606A, with resuming RRC with the UE 112 using a retrieved UE context (e.g., sending a RRCResume message to the UE 112). The method optionally continues at step 606B, with releasing RRC with the UE 112 (e.g., sending a RRCRelease message to the UE 112).

FIG. 7 is a flow diagram of a process for forwarding UE context. In some embodiments, the method is performed by an old network node 102-2. The method begins at step 700, with receiving a request from a new network node 102-1 for UE context retrieval for a UE 112 in RRC_INACTIVE state. The method optionally continues at step 702, with determining whether to relocate a UE context anchor (e.g., based on information in a RRC container of the request from the new network node 102-1).

The method optionally continues at step 704A, with accepting the UE context retrieval. The method optionally continues at step 704B, with rejecting the UE context retrieval. The method optionally continues at step 704C, with partially rejecting the UE context retrieval. The method continues at step 706, with transmitting a response to the new network node 102-1 indicating acceptance, rejection, or partial rejection of the UE context retrieval.

Figure 8:
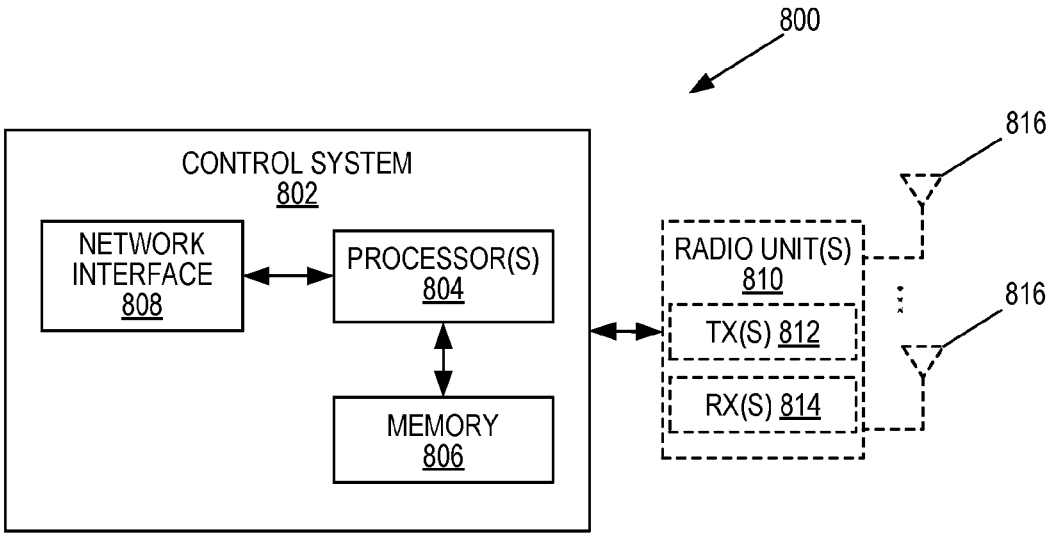
FIG. 8 is a schematic block diagram of a network node in accordance with some embodiments of the present disclosure.

FIG. 8 is a schematic block diagram of a network node 800 according to some embodiments of the present disclosure. Optional features are represented by dashed boxes. The network node 800 may be, for example, a base station 102 or 106 or another network node that implements all or part of the functionality of the base station 102 or gNB described herein. As illustrated, the network node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the network node 800 may include one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a network node 800 as described herein. In some embodiments, the function(s) are implemented in software that is stored, e.g., in the memory 806 and executed by the one or more processors 804.

Figure 9:
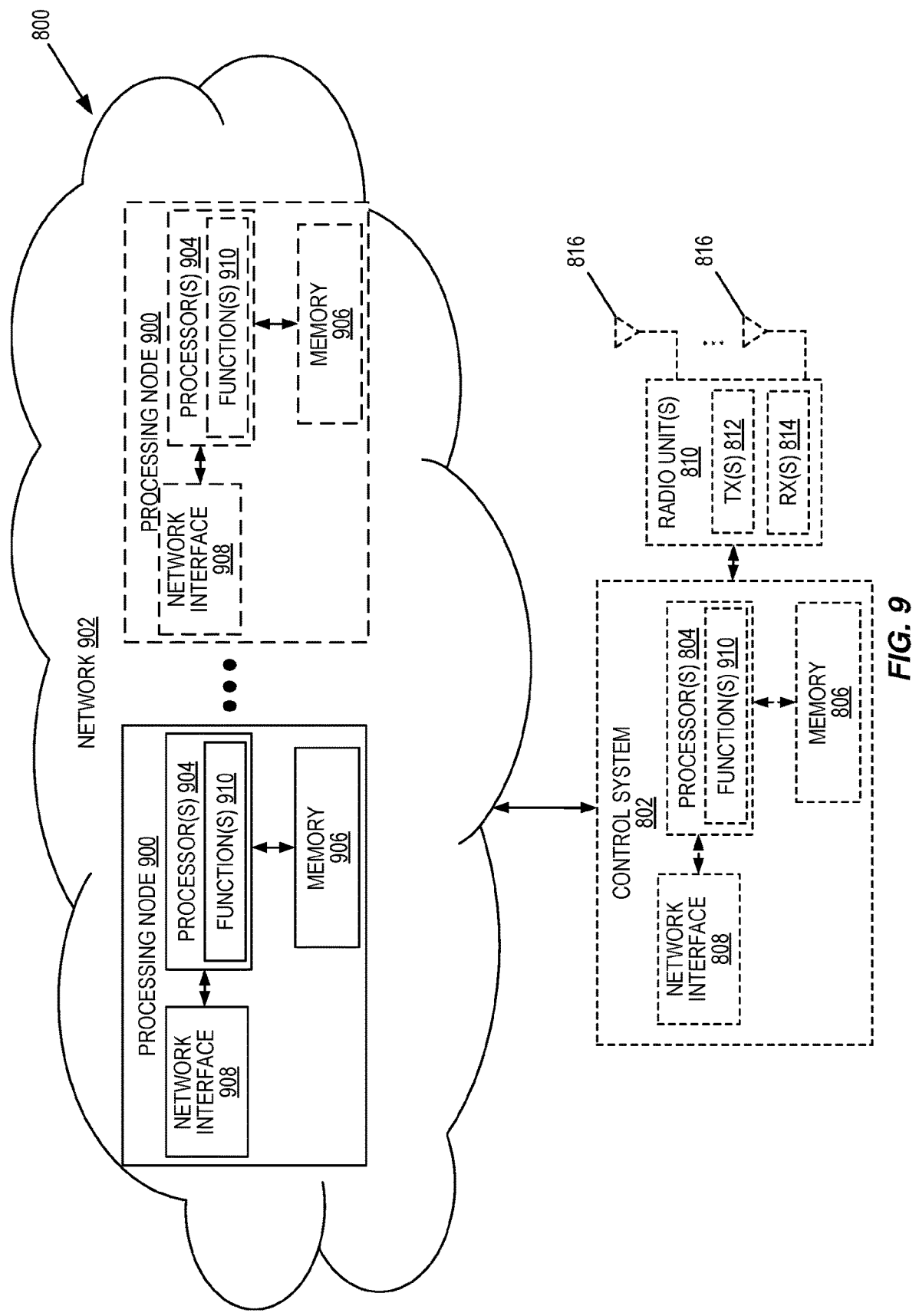
FIG. 9 is a schematic block diagram that illustrates a virtualized embodiment of the network node in accordance with some embodiments of the present disclosure.

FIG. 9 is a schematic block diagram that illustrates a virtualized embodiment of the network node 800 according to some embodiments of the present disclosure. This discussion is equally applicable to a radio access node and other types of network nodes. Further, other types of network nodes may have similar virtualized architectures. Again, optional features are represented by dashed boxes.

As used herein, a "virtualized" network node is an implementation of the network node 800 in which at least a portion of the functionality of the network node 800 is implemented as a virtual component(s) (e.g., via a virtual machine(s) executing on a physical processing node(s) in a network(s)). As illustrated, in this example, the network node 800 may include the control system 802 and/or the one or more radio units 810, as described above. The control system 802 may be connected to the radio unit(s) 810 via, for example, an optical cable or the like. The network node 800 includes one or more processing nodes 900 coupled to or included as part of a network(s) 902. If present, the control system 802 or the radio unit(s) 810 are connected to the processing node(s) 900 via the network 902. Each processing node 900 includes one or more processors 904 (e.g., CPUs, ASICs, FPGAs, and/or the like), memory 906, and a network interface 908.

In this example, functions 910 of the network node 800 described herein are implemented at the one or more processing nodes 900 or distributed across the one or more processing nodes 900 and the control system 802 and/or the radio unit(s) 810 in any desired manner. In some particular embodiments, some or all of the functions 910 of the network node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of network node 800 or a node (e.g., a processing node 900) implementing one or more of the functions 910 of the network node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
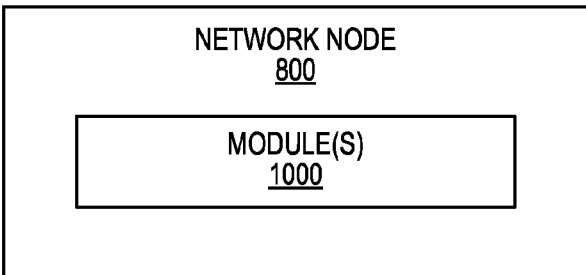
FIG. 10 is a schematic block diagram of the network node in accordance with some embodiments of the present disclosure.

FIG. 10 is a schematic block diagram of the network node 800 according to some other embodiments of the present disclosure. The network node 800 includes one or more modules 1000, each of which is implemented in software. The module(s) 1000 provide the functionality of the network node 800 described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

FIG. 11 is a schematic block diagram of a wireless communication device 1100 according to some embodiments of the present disclosure. As illustrated, the wireless communication device 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The transceiver(s) 1106 includes radio front end circuitry connected to the antenna(s) 1112 that is configured to condition signals communicated between the antenna(s) 1112 and the processor(s) 1102, as will be appreciated by on of ordinary skill in the art. The processors 1102 are also referred to herein as processing circuitry. The transceivers 1106 are also referred to herein as radio circuitry. In some embodiments, the functionality of the wireless communication device 1100 described above may be fully or partially implemented in software that is, e.g., stored in the memory 1104 and executed by the processor(s) 1102. Note that the wireless communication device 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the wireless communication device 1100 and/or allowing output of information from the wireless communication device 1100), a power supply (e.g., a battery and associated power circuitry), etc.

In some embodiments, a computer program including instructions which, when executed by at least one processor, causes the at least one processor to carry out the functionality of the wireless communication device 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
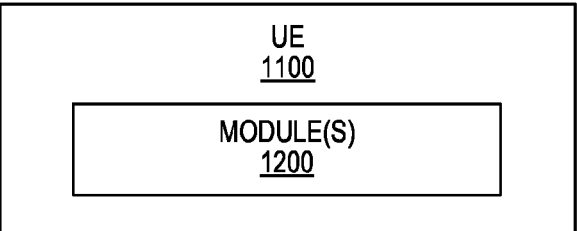
FIG. 12 is a schematic block diagram of the wireless communication device in accordance with some embodiments of the present disclosure.

FIG. 12 is a schematic block diagram of the wireless communication device 1100 according to some other embodiments of the present disclosure. The wireless communication device 1100 includes one or more modules 1200, each of which is implemented in software. The module(s) 1200 provide the functionality of the wireless communication device 1100 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Management Function
AN Access Network
AS Application Server
ASIC Application Specific Integrated Circuit
AUSF Authentication Server Function
CG Cell Group
CP Control Plane
CPU Central Processing Unit
DL Downlink
DN Data Network
DRB Data Radio Bearer
DSP Digital Signal Processor
EDT Early Data Transmission
eNB Enhanced or Evolved Node B
EPC Evolved Packet Core
EPS Evolved Packet System
E-UTRAN Evolved Universal Terrestrial Radio Access Network
FPGA Field Programmable Gate Array
gNB New Radio Base Station
gNB-CU New Radio Base Station Central Unit
gNB-DU New Radio Base Station Distributed Unit
HSS Home Subscriber Server
IoT Internet of Things
IP Internet Protocol
LTE Long Term Evolution
LTE-M Long Term Evolution Machine Type Communication
MBB Mobile Broadband
MME Mobility Management Entity
MO Mobile Originated
MTC Machine Type Communication
NB-IoT Narrowband Internet of Things
NEF Network Exposure Function
NF Network Function
NG Next Generation NGAP Next Generation Application Protocol
NG-RAN Next Generation Radio Access Network
NR New Radio
NRF Network Function Repository Function
NSSF Network Slice Selection Function
PC Personal Computer
PCF Policy Control Function
PDU Protocol Data Unit
P-GW Packet Data Network Gateway
PUR Preconfigured Uplink Resources
QoS Quality of Service
RA Random Access
RACH Random Access Channel
RAM Random Access Memory
RAN Radio Access Network
Rel-15 Release 15
Rel-16 Release 16
Rel-17 Release 17
RLC Radio Link Control
RLF Radio Link Failure
RNA Radio Access Network-based Notification Area
ROM Read Only Memory
RRC Radio Resource Control
RRH Remote Radio Head
RTT Round Trip Time
SCEF Service Capability Exposure Function
SDT Small Data Transmission
SMF Session Management Function
TCI Transmission Configuration Indicator
TRP Transmission/Reception Point
TS Technical Specification
UDM Unified Data Management
UE User Equipment
UL Uplink
UP User Plane
UPF User Plane Function
WI Work Item
XnAP Xn Application Protocol Those skilled in the art will recognize improvements and modifications to the embodiments of the present disclosure. All such improvements and modifications are considered within the scope of the concepts disclosed herein.

The invention claimed is:

1. A method performed by a network node for retrieving User Equipment (UE) context, the method comprising:
   receiving a Radio Resource Control (RRC) resume request message from a UE;
   transmitting a request to an old network node for UE context retrieval; and
   receiving a response from the old network node,
   wherein the request comprises (a) an indication that the UE context retrieval is related to a Small Data Transmission, SDT, performed by the UE and (b) UE assistance information that informs the old network node that the UE has started a SDT procedure, wherein the UE assistance information comprises any one or more of the following: a buffer status reporting and information that the UE intends to send subsequent data after transmitting initial data using the SDT with RRC signaling, and
   wherein the response from the old network node indicates the UE context retrieval is partially rejected.

2. The method of claim 1, wherein the network node transmits assistance data necessary for sending the UE assistance information to the old network node before receiving the RRC resume request message from the UE.

3. The method of claim 1, wherein the RRC resume request message comprises a request for resumption of a suspended Radio Resource Control, RRC, connection.

4. The method of claim 1, wherein the RRC resume request message comprises a request to perform a Radio Access Network-based Notification Area, RNA, update.

5. The method of claim 1, wherein transmitting the request to the old network node for retrieval of the UE context comprises a RETRIEVE UE CONTEXT REQUEST with the indication that the UE context retrieval is related to SDT and wherein the indication comprises an SDT indicator that indicates SDT.

6. The method of claim 1, wherein the response from the old network node comprises a part of the UE context in a RETRIEVE UE CONTEXT RESPONSE message.

7. The method of claim 1, wherein the response from the old network node comprises a part of the UE context in a RETRIEVE UE CONTEXT FAILURE message.

8. The method of claim 7, wherein the RETRIEVE UE CONTEXT FAILURE message has a cause value for Small Data Transmission, SDT.

9. The method of claim 1, further comprising releasing Radio Resource Control, RRC, with the UE.

10. The method of claim 9, wherein releasing RRC with the UE comprises sending a RRCRelease message to the UE.

11. The method of claim 1, wherein:

the indication that the UE context retrieval is related to SDT comprises an SDT indicator that indicates SDT; and the UE assistance information comprises the information that the UE intends to send subsequent data after transmitting initial data using the SDT with RRC signaling.

12. A method performed by a network node for forwarding User Equipment, UE, context, the method comprising:

receiving a request from a new network node for UE context retrieval for a UE in RRC_INACTIVE state; and transmitting a response to the new network node indicating a partial rejection of the UE context retrieval, wherein the request includes (a) an indication that the UE context retrieval is related to a Small Data Transmission, SDT, performed by the UE and (b) UE assistance information that informs the network node that the UE has started a SDT procedure, wherein the UE assistance information comprises any one or more of the following: a buffer status reporting and information that the UE intends to send subsequent data after transmitting initial data using the SDT with Radio Resource Control (RRC) signaling.

13. The method of claim 12, wherein the request from the new network node comprises a RRC container with the assistance information.

14. The method of claim 12, wherein the request from the new network node comprises a RRC container with the indication that the UE context retrieval is related to SDT and wherein the indication comprises an SDT indicator that indicates SDT.

15. The method of claim 13, further comprising determining whether to relocate a UE context anchor based on information in the RRC container.

16. The method of claim 12, wherein the request from the new network node comprises a RETRIEVE UE CONTEXT REQUEST.

17. The method of claim 12, wherein the response to the new network node comprises a part of the UE context in a RETRIEVE UE CONTEXT RESPONSE message.

18. The method of claim 12, wherein the response to the new network node comprises a part of the UE context in a RETRIEVE UE CONTEXT FAILURE message.

19. The method of claim 18, wherein the RETRIEVE UE CONTEXT FAILURE message has a cause value for SDT.

20. The method of claim 12, wherein:

the indication that the UE context retrieval is related to SDT comprises an SDT indicator that indicates SDT; and the UE assistance information comprises the information that the UE intends to send subsequent data after transmitting initial data using the SDT with RRC signaling.

21. A network node adapted to:

receive a Radio Resource Control, RRC, resume request message from a User Equipment, UE;

transmit a request to an old network node for UE context retrieval; and receive a response from the old network node, wherein the request includes (a) an indication that the UE context retrieval is related to a Small Data Transmission, SDT, performed by the UE and (b) UE assistance information that informs the old network node that the UE has started a SDT procedure, wherein the UE assistance information comprises any one or more of the following: a buffer status reporting, information that the UE intends to send subsequent data after transmitting initial data using the SDT with RRC signaling, and wherein the response from the old network node indicates the UE context retrieval is partially rejected.

22. A network node comprising processing circuitry configured to cause the network node to:

receive a Radio Resource Control, RRC, resume request message from a User Equipment, UE;

transmit a request to an old network node for UE context retrieval; and receive a response from the old network node, wherein the request includes (a) an indication that the UE context retrieval is related to a Small Data Transmission, SDT, performed by the UE and (b) UE assistance information that informs the old network node that the UE has started a SDT procedure, wherein the UE assistance information comprises any one or more of the following: a buffer status reporting, information that the UE intends to send subsequent data after transmitting initial data using the SDT with RRC signaling, and wherein the response from the old network node indicates the UE context retrieval is partially rejected.

23. A network node adapted to:

receive a request from a new network node for User Equipment, UE, context retrieval for a UE in RRC_INACTIVE state; and transmit a response to the new network node indicating a partial rejection of the UE context retrieval, wherein the request includes (a) an indication that the UE context retrieval is related to a Small Data Transmission, SDT, performed by the UE and (b) UE assistance information that informs the network node that the UE has started a SDT procedure, wherein the UE assistance information comprises any one or more of the following: a buffer status reporting, information that the UE intends to send subsequent data after transmitting initial data using the SDT with Radio Resource Control (RRC) signaling.

24. A network node comprising processing circuitry configured to cause the network node to:

receive a request from a new network node for User Equipment, UE, context retrieval for a UE in RRC_I-NACTIVE state; and transmit a response to the new network node indicating a partial rejection of the UE context retrieval, wherein the request includes (a) an indication that the UE context retrieval is related to a Small Data Transmission, SDT, performed by the UE and (b) UE assistance information that informs the network node that the UE has started a SDT procedure, wherein the UE assistance information comprises any one or more of the following: a buffer status reporting, information that the UE intends to send subsequent data after transmitting initial data using the SDT with Radio Resource Control (RRC) signaling.

* * * * *